United States Patent
Pruneri et al.

(10) Patent No.: US 11,686,680 B2
(45) Date of Patent: Jun. 27, 2023

(54) APPARATUS FOR EXPLORING AN OPTICAL PROPERTY OF A SAMPLE

(71) Applicants: FUNDACIÓ INSTITUT DE CIÈNCIES FOTÒNIQUES, Barcelona (ES); INSTITUCIÓ CATALANA DE RECERCA I ESTUDIS AVANÇATS, Barcelona (ES)

(72) Inventors: Valerio Pruneri, Barcelona (ES); Roland Alfonso Terborg, Barcelona (ES); Josselin Pello, Barcelona (ES); Marc Jofre, Barcelona (ES); Pedro Martinez, Barcelona (ES)

(73) Assignees: FUNDACIÓ INSTITUT DE CIÈNCIES FOTÒNIQUES, Barcelona (ES); INSTITUCIÓ CATALANA DE RECERCA I ESTUDIS AVANÇATS, Barcelona (ES)

( * ) Notice: Subject to any disclaimer, the term of this patent is extended or adjusted under 35 U.S.C. 154(b) by 6 days.

(21) Appl. No.: 17/058,064

(22) PCT Filed: May 23, 2018

(86) PCT No.: PCT/ES2018/070372
§ 371 (c)(1),
(2) Date: Nov. 23, 2020

(87) PCT Pub. No.: WO2019/224405
PCT Pub. Date: Nov. 28, 2019

(65) Prior Publication Data
US 2021/0364432 A1    Nov. 25, 2021

(51) Int. Cl.
*G01N 21/552*    (2014.01)
(52) U.S. Cl.
CPC ... *G01N 21/554* (2013.01); *G01N 2201/0634* (2013.01); *G01N 2201/0636* (2013.01)

(58) Field of Classification Search
CPC .... G01N 21/45; G01N 21/553; G01N 21/554; G01N 2201/0634; G01N 2201/0636
(Continued)

(56) References Cited

U.S. PATENT DOCUMENTS

| | | | |
|---|---|---|---|
| 4,980,566 A | * | 12/1990 | Heilweil ............... G01J 3/2889 250/338.1 |
| 6,128,127 A | | 10/2000 | Kusaka |

(Continued)

FOREIGN PATENT DOCUMENTS

| | | |
|---|---|---|
| JP | H07253545 A | 10/1995 |
| JP | 3894863 A | 3/2007 |

OTHER PUBLICATIONS

Kochergin, V. et al., "Visualisation of the angular dependence of the reflected-radiation phase under condition of a surface-plasmon resonance and its sensor applications," Quantrum Electronics, vol. 28, No. 9, Available as Early as Apr. 9, 1998, 6 pages.
(Continued)

*Primary Examiner* — Sunghee Y Gray
(74) *Attorney, Agent, or Firm* — McCoy Russell LLP

(57) ABSTRACT

The invention relates to an apparatus for probing a sample comprising a light source for emitting an illuminating light beam, a birefringent element for splitting the illuminating light beam into two sheared beams, a reflective element for reflecting the two sheared beams, wherein the apparatus is configured such that the reflected beams propagate through the birefringent element for recombining the reflected beams, and a detector for detecting the recombined beam, wherein the sample is arrangeable in the optical path of the sheared beams or at the backside of a reflective surface in the optical path of the sheared beams, the reflective surface exhibiting a surface plasmon resonance or a localized surface plasmon resonance.

9 Claims, 4 Drawing Sheets

(58) Field of Classification Search
USPC .......................................................... 356/445
See application file for complete search history.

(56) References Cited

U.S. PATENT DOCUMENTS

| | | | | |
|---|---|---|---|---|
| 8,143,600 | B2* | 3/2012 | Seibel | G06T 11/006 |
| | | | | 250/461.2 |
| 8,472,031 | B2 | 6/2013 | Barbarossa et al. | |
| 2003/0219809 | A1* | 11/2003 | Chen | G01N 21/553 |
| | | | | 506/4 |
| 2005/0052655 | A1 | 3/2005 | Jones et al. | |
| 2007/0008546 | A1 | 1/2007 | Ho et al. | |
| 2011/0226317 | A1* | 9/2011 | Xu | H01L 31/022425 |
| | | | | 136/255 |
| 2017/0242206 | A1* | 8/2017 | Chen | G02B 6/00 |

OTHER PUBLICATIONS

Bera, M. et al., "Experimental surface plasmon resonance modulated radially sheared interference imaging using a birefringent lens," Applied Physics Letters, vol. 104, No. 25, Jun. 23, 2014, 6 pages.

Terborg, R. et al., "Ultrasensitive interferometric on-chip microscopy of transparent objects," Science Advances, vol. 2, No. 6, Jun. 10, 2016, 8 pages.

Yesilkoy, F. et al., "Phase-sensitive plasmonic biosensor using a portable and large field-of-view interferometric microarray imager," Light: Science & Applications, vol. 7, No. 17152, Oct. 31, 2017, 10 pages.

ISA European Patent Office, International Search Report Issued in Application No. PCT/ES2018/070372, dated Nov. 28, 2018, WIPO, 8 pages.

* cited by examiner

APPARATUS FOR EXPLORING AN OPTICAL PROPERTY OF A SAMPLE

CROSS REFERENCE TO RELATED APPLICATION

The present application is a U.S. National Phase of International Application No. PCT/ES2018/070372 entitled "APPARATUS FOR EXPLORING AN OPTICAL PROPERTY OF A SAMPLE," and filed on May 23, 2018. The entire contents of the above-listed application is hereby incorporated by reference for all purposes.

TECHNICAL FIELD

The invention relates to an apparatus for probing a sample, particularly an optical property of a fully or partially transparent layer of material.

BACKGROUND AND SUMMARY

In bio-sensing, objects of interest like cells and protein layers are highly transparent. Therefore, they are usually detected indirectly using external light emitting fluorescent labels, or directly using an interferometric scheme to measure the phase shifts experienced by light as it travels through them.

One such apparatus is known from U.S. Pat. No. 8,472,031 B2, which uses two sheared and quasi-overlapped illuminating beams experiencing relative phase shifts when propagating through the object, and an image sensor array to record the resulting interference pattern.

A disadvantage of this known apparatus is its limited sensitivity, which is particularly linked to the fact that the phase shifts experienced by light traveling through the sample are usually small. Furthermore, the various elements of the apparatus render it comparatively large.

It is therefore an object of the present invention to provide an improved apparatus for probing an optical property of a sample, which is particularly more compact and/or more sensitive in use.

This object is achieved with an apparatus according to claim 1. Preferred embodiments are specified in the dependent claims.

According to the first aspect of the invention as specified in claim 1, a reflective element is provided reflecting the two sheared beams back so that the reflected beams may again propagate through the birefringent element used for splitting the illuminating light beam into the two sheared beams. The two sheared beams, thus, are recombined after reflection using the same birefringent element. After being recombined by the birefringent element, the recombined beam is detected by a detector. In use, the sample is arranged in the optical path of the sheared beams or at the backside of a reflective surface in the optical path of the sheared beams, the reflective surface exhibiting a surface plasmon resonance or a localized surface plasmon resonance.

In view of this, compared to known transmission scheme apparatuses, the number of elements can be reduced. For instance, in the prior art, at least two birefringent elements were needed, one for splitting the illuminating light beam and one for recombining the two sheared beams. According to the first aspect of the invention, only one such element is sufficient. Furthermore, since the same birefringent element is used for splitting the illuminating light beam and for recombining the two sheared beams after reflection, the shear outside of the sensing region is perfectly canceled, so that lower quality optical components can be used, and alignment is facilitated.

The apparatus may be configured such that the birefringent element is arranged in the optical path of the reflected beams. The reflected beams may be directly reflected towards the birefringent element. In other words, the reflected beams may propagate along their direction of propagation towards the birefringent element. Alternatively, the apparatus may comprise one or more further optical elements changing the direction of propagation of the reflected beams so that they are directed towards the birefringent element.

The sample may be arrangeable such that the sheared beams and the reflective beams propagate in use through the sample. In other words, the sample may be arrangeable in the optical path of the sheared beams, particularly between the birefringent element and the reflective element. In this case, the sample is probed twice, which increases the sensitivity of the apparatus compared to using a transmission scheme as known from the prior art.

Alternatively, the sample may be arrangeable at the backside of a reflective surface exhibiting a surface plasmon resonance or a localized surface plasmon resonance. The reflective surface is arranged in the optical path of the sheared beams. Thus, the reflective surface may reflect the sheared beams from a first direction of propagation to a second direction of propagation in use of the apparatus. The expression "backside" shall be understood with reference to the direction of arrival of the sheared beams on the reflective surface. In other words, the backside of the reflective surface is the side facing away from the incident sheared beams being reflected by the reflective surface. The sample may in use influence the resonance properties of the reflective surface, thereby influencing properties of the reflected sheared beams. Particularly, an evanescent electromagnetic field is excited on the side of the reflective surface. The amplitude and phase of the evanescent field are affected by any changes in the medium close to the reflective layer or its backside, i.e. particularly by the sample (the specification "close" means in this case distances in the order of the illumination wavelength). This modified evanescent field in turn affects the reflected sheared beams whose changes are subsequently measured.

The reflective surface may be part of the reflective element. In other words, the reflective element may comprise the reflective surface exhibiting a surface plasmon resonance or a localized surface plasmon resonance. The reflective element may in this case particularly comprise one or more channels or cavities, such that the sample is arrangeable in these channels or cavities at the backside of or behind the reflective surface. This arrangement of the sample has the advantage that the sheared beams do not pass through a possible liquid containing the probe, therefore avoiding possible artifacts. The reflective surface may in this case particularly exhibit a localized surface plasmon resonance.

Alternatively, the reflective surface may be part of a second or further reflective element arranged in the optical path of the sheared beams, particularly in the optical path leading from the birefringent element to the first reflective element mentioned herein above. For instance, the reflective surface may be part of a surface plasmon resonance prism, as further detailed below.

Plasmonic resonances in general are the result of charge oscillations in a metallic surface due to an optical field (which is an oscillating electric field). In surface plasmon resonance, SPR, a flat metallic surface on top of a dielectric substrate (from where the beam gets reflected) is used. To induce the correct oscillation frequency on the charges in the metal, the beam needs to be reflected with a specific angle. In localized surface plasmon resonance, LSPR, the surface is nanostructured and these structures act as antennas, inducing the charge oscillation with less dependence on the angle of incidence. Thus, the plasmonic "sensing effect" of the LSPR is stronger but with a shorter sensing distance than the one in SPR.

A dielectric substrate exhibiting LSPR can also be placed in the optical path of the sheared beams, in particular between the birefringent element and the reflective element, wherein the sample is arranged on or close to the dielectric substrate exhibiting LSPR (the specification "close" means in this case distances in the order of the illumination wavelength). The dielectric substrate exhibiting LSPR (also referred to as LSPR substrate) may particularly be arranged such that the incident angle of the sheared beams on the dielectric substrate has a specific angle, e.g. 90°. Depending on the angle and nano-structure geometry, the LSPR substrate can work either in transmission or reflection. In the case of transmission, the sheared beams pass twice through the sample on or close to the LSPR substrate. In the case of reflection, the LSPR substrate reflects the light and the sample to be detected is placed at the backside of the surface where the nano-structure is located. In this way, the evanescent field from the nano-structures interacts with the layer of the sample in proximity or contact with the nano-structure, thus producing phase shifts on the sheared beams. The LSPR substrate can have a nano-particle and/or nano-hole structure.

The LSPR effect in transmission or reflection can alternatively or additionally be obtained or enhanced by adding metal nanoparticles to the sample.

The metal nano-particles, nano-antennas, nano-holes and/or films of the plasmonic structures may be replaced by dielectric or semiconductor counterparts, which are capable of providing enhanced transmission and reflective behaviors. These dielectric or semiconductor counterparts, preferably with high refractive index (e.g. titanium dioxide, $TiO_2$, or silicon, Si), can be combined with the sheared beams and the reflective configuration of the invention.

The sample may be a fully or partially transparent sample, in particular a fully or partially transparent material layer. For instance, the sample may be a biological sample, such as one or more cells and/or one or more protein layers. The sample may be solid, liquid or gaseous. A medium surrounding or embedding the sample may also be solid, liquid or gaseous. For instance, the sample may be a solid material dispersed in a liquid or gas.

The apparatus may be used for probing an optical property of the sample, such as the refractive index of the sample or the interference pattern caused by the phase shifts induced by the sample. From this optical property further information may be derived, such as structural parameters or material parameters.

The light source may be an LED, a laser, or any other source of light suitable for probing the optical property of the sample. In general, the light source may be a planar optical beam source. The coherence length should be larger than the largest optical path difference (phase shift) to be detected and should be chosen such that artifacts (resulting from unwanted element reflections or other spurious signals, for instance) are avoided as much as possible. In particular, the coherence length can be in the order of the shear distance or larger.

The apparatus may be configured such that in use, the two sheared beams propagate through the sample of interest and are reflected by the reflective element. After reflection, the two reflected beams propagate again through the sample, before being recombined by the birefringent element into one recombined beam, which is eventually detected by the detector. Effectively, the sheared beams may form the two arms of a Mach-Zehnder interferometer, which can be used to accurately detect the phase difference between any two points of the sample separated by the shear distance.

The sheared beams may be quasi-overlapping in the sense that the beams partially overlap and further comprise non-overlapping areas. The shear distance, which corresponds to the offset between the two sheared beams, may be adapted to the anticipated size of the structures of the sample. For bio-sensing applications, the shear distance may, for instance, be between 10 and 50 μm. The shear distance may particularly be chosen based on the following considerations:
- it should be larger than the smallest features of the image that can or should be resolved;
- it should be larger than the pixel size of the detector; and/or
- for sources with low coherence, it should be small enough such that two points separated by the shear distance give a good interferometric signal.

The detector may comprise an image sensor array for detecting the recombined beam in a spatially resolved manner. In other words, the detector may be an imaging sensor. For instance, a charge-coupled device (CCD) or a complementary metal-oxide-semiconductor (CMOS) detector may be used as a detector. The pixel size of the detector may be in the range of 2×2 μm. The recombined beam may directly hit the detector. In other words, no imaging optics, such as lenses, may be foreseen.

The sample may be arrangeable on a sample carrier, which may, for instance, correspond to a microfluidic sample chamber, a lab-on-chip, a micro-well plate or a simple microscope slide. This sample carrier may be arranged in the apparatus in the optical path of the sheared beams between the birefringent element and the reflective element or at the backside of a reflective surface in the optical path of the sheared beams, the reflective surface exhibiting a surface plasmon resonance or a localized surface plasmon resonance.

The sample carrier may be placed in close proximity to or in contact with the reflective element or in close proximity to or in contact with the backside of the reflective surface exhibiting a surface plasmon resonance or a localized surface plasmon resonance.

The specification "in close proximity" or "close to" herein means distances larger than 0 and less than ten times, particularly less than five times the illumination wavelength.

The apparatus may further comprise a polarizing element for polarizing the illuminating light beam prior to entering the birefringent element and for polarizing the recombined beam prior to be detected by the detector.

The polarizing element may particularly be a polarizing beam splitter and/or the birefringent element may be Savart plate. A Savart plate is composed of two birefringent crystals which splits the illuminating light beam into the two partially overlapping sheared beams. The use of the Savart plate is advantageous since the two sheared beams then have uniform optical properties. The latter is important for making precise measurements of the optical property. The birefringent element may alternatively be a single plate of a birefringent crystal. A polarizing beam splitter acts partly as a semi-transparent mirror. In other words, some of the incident light is reflected and polarized while the remainder is transmitted. Using a polarizing beam splitter allows saving space. Alternatively, a semitransparent mirror or a mirror, which is off-axis and tilted, may be used respectively in combination with two polarizers, one between the light source and the mirror and the other one between the mirror and the detector.

The apparatus may further comprise a semi-reflective element in the optical path of the sheared beams, in particular between the birefringent element and the reflective element. The semi-reflective element may particularly be arranged such that the sheared beams reflected by the reflective element are partially reflected back towards the reflective element by the semi-reflective element when in use. The transmitted part may propagate towards the birefringent element. For instance, the semi-reflective element may be a semitransparent mirror.

In this embodiment, the sheared beams propagate multiple times between the reflective element and the semi-reflective element, and the effects caused by the sample, particularly arranged between the reflective element and the semi-reflective element, may be enhanced by a factor proportional to the finesse of the cavity. In other words, a Fabry-Perot cavity may be formed by the reflective element and the semi-reflective element.

The birefringent element may be mounted such that it is tiltable with respect to the direction of propagation of the illuminating light beam. The birefringent element, thus, may be arrangeable at an angle with respect to a plane perpendicular to the direction of propagation of the illuminating light beam. In this way, it is possible to introduce a variable phase shift between the two sheared beams. This variable phase shift can be used to perform a phase-shifting interferometric analysis of the sample and to further enhance the sensitivity of the apparatus.

The reflective element may particularly be a mirror. In particular, the mirror may correspond to a fully or partially reflective metallic mirror, dielectric mirror or plasmonic mirror. In the case of a plasmonic mirror, a patterned structure, for instance, a patterned metallic structure, is provided on the reflective surface, exhibiting a localized surface plasmon resonance (LSPR). In such cases, if the sample is brought in close proximity to the reflective surface of the plasmonic mirror, the sample can influence its resonance properties. In turn, the plasmonic properties may influence the properties of the reflected beams.

Particularly in the case of a plasmonic mirror, the sample may be arrangeable on a sample carrier placed in close proximity to or in contact with the reflective surface, or, as discussed above, in a channel or cavity of the plasmonic mirror at the backside or behind the reflective surface.

The apparatus may further comprise a prism with a reflective surface for reflecting the sheared beams from a first direction of propagation to a second direction of propagation at an angle with respect to the first direction of propagation, wherein the reflective surface exhibits a surface plasmon resonance, and wherein the sample is arrangeable at the backside of the reflective surface. In this case, thus, the prism corresponds to the second reflective element mentioned above. In use, the two sheared beams may enter the prism through an input face, are reflected by the reflective surface, and exit through an output face.

By the reflection on the reflective surface, the direction of propagation of the two sheared beams changes to a direction of propagation at an angle with respect to the direction of propagation of the sheared beams when entering the prism.

In this case, the reflective element may be placed in the optical path of the sheared beams such that the sheared beams reflected by the reflective surface and propagating in the second direction of propagation are reflected by the reflective element back towards the prism. In this way, in use, the reflected sheared beams again enter the prism through the output face, are reflected by the reflective surface, and exit through the input face of the prism. Then again, the reflected sheared beams may be recombined by the birefringent element and detected by a detector as discussed above.

In this case, thus, the reflective element may reflect the sheared beams propagating along the second direction of propagation towards the reflective surface of the prism.

Since the reflective surface of the prism is forming a surface plasmon resonance (SPR) interface, the sheared beams couple with the sample via the evanescent field. Thus, the sample influences the properties of the sheared beams although the sheared beams do not actually propagate through the sample.

The prism may be mounted or arranged such that it is tiltable with respect to the incident direction of the sheared beams. In this way, the angle of incidence and, thus, the angle of reflection may be adapted, particularly to optimize the surface plasmon resonance effect.

The angle between the first direction of propagation and the reflective surface of the prism may be between 30° and 50°, particularly between 35° and 45°. The angle between the first and second direction of propagation, thus, may be between 80° and 120°, particularly between 90° and 110°.

In the case of the apparatus further comprising a prism, the sample carrier for arranging the sample may be particularly provided in close proximity to or in contact with the backside of the reflective surface of the prism.

The reflective surface of the prism may be formed by an interface layer between the prism and its surrounding. The backside of the reflective surface may particularly refer to the side of the interface layer facing away from the interior of the prism, while the reflective surface may refer to the side of the interface layer facing towards the interior of the prism through which the sheared beams are incident on the interface layer in use.

According to a second aspect of the invention an apparatus for probing an optical property of a sample is provided which also allows increasing the sensitivity and, thus, solving the technical problem identified at the beginning. The second aspect is characterized by providing a prism with a reflective surface for reflecting the illuminating light beam from a first direction of propagation to a second direction of propagation at an angle with respect to the first direction of propagation, wherein the reflective surface exhibits a surface plasmon resonance, and wherein the sample is arrangeable at the backside of the reflective surface. In contrast to the apparatus including a prism discussed herein above, no reflective element is arranged for reflecting the sheared beams propagating along the second direction back towards the prism. Instead, a birefringent element and a detector for creating and analyzing two sheared beams are provided in the optical path of the illuminating light beam reflected by the reflective surface of the prism.

In this case, particularly, the birefringent element may be used or configured to split the reflected illuminating light beam into two sheared beams. A linear polarizer may be arranged between the birefringent element and the detector. This polarizer may be used or configured to create interference between the two sheared beams. The interference pattern may be detected by the detector in use of the apparatus. The apparatus may further comprise a polarizing element arranged between the light source and the prism for polarizing the illuminating light beam. The two polarizers can be aligned parallel or crossed, in particular.

The birefringent element may be a plate of a birefringent crystal or a Savart plate. The other elements may comprise one or more of the features identified above for the first aspect of the invention, apart from the reflective element.

The apparatus may also function in the same manner as discussed above in the embodiment of the apparatus according to the first aspect with a prism, apart from the reflective element.

In this case, the birefringent element may be a second birefringent element and the apparatus may further comprise a first birefringent element for splitting the illuminating light beam into two sheared beams. The first birefringent element may particularly be arranged in the optical path of the illuminating light beam between the light source and the prism. The reflective surface is then provided for reflecting the sheared beams in use of the apparatus from the first direction of propagation to the second direction of propagation. The second birefringent element is then configured for recombining the reflected sheared beams and the detector is configured for detecting the recombined beam.

The apparatus may comprise one or more of the features identified above for the first aspect of the invention, apart from the reflective element.

The first and second birefringent elements may, particularly, each be a Savart plate.

The apparatus may further comprise a first polarizing element arranged between the light source and the first birefringent element and a second polarizing element arranged between the second birefringent element and the detector.

The inventors found out that by using the prism with a surface plasmon resonance surface allows the reduction of the measurement noise for the phase measurement, meaning that more accurate detection can be achieved. Furthermore, this apparatus can probe both the phase dependent and amplitude dependent properties of the surface plasmon resonance reflection of the sample.

BRIEF DESCRIPTION OF THE FIGURES

Advantageous embodiments will now be described in combination with the enclosed figures.

DETAILED DESCRIPTION

Figure 1:
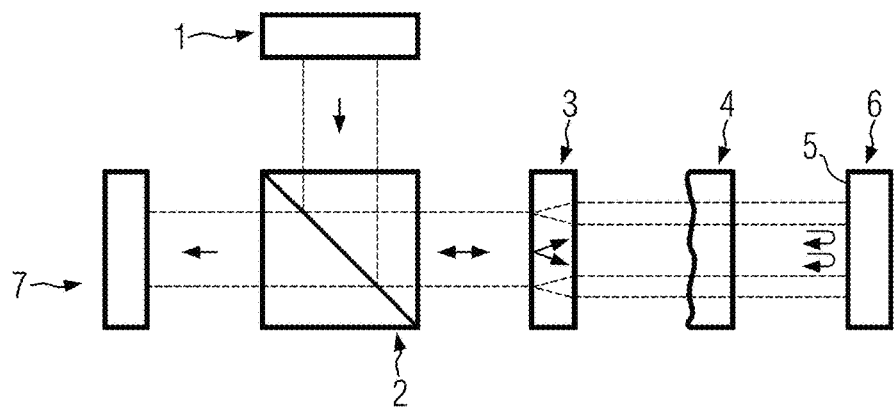
FIG. 1 illustrates the setup of an exemplary apparatus according to the first aspect of the invention.

FIG. 1 shows in a schematic form a possible setup of an exemplary apparatus according to the first aspect of the invention. In the following, the apparatus will be explained with reference to its use. An illuminating light beam is emitted by a light source 1, for instance an light emitting diode, LED, or a laser. Possible wavelengths for LEDs are 490 nm, 530 nm, 625 nm or 810 nm, all with output powers of the order of a few mW. In general, wavelengths from the ultraviolet to the infrared range—in particular near- and mid-infrared range—and powers ranging to several watts are possible.

The illuminating light beam is then polarized and deflected from a first direction of propagation to a second, orthogonal direction of propagation by a polarizing beam splitter 2. Subsequently, a Savart plate 3 acting as birefringent element splits the illuminating light beam into two partially overlapping sheared beams. In FIG. 1, two light rays from the illuminating light beam are shown for illustration. The two light rays may, for instance, correspond to the bordering light rays at opposite borders of the illuminating light beam.

The two sheared beams then propagate through a sample 4 arranged on a sample carrier (not separately shown). The sample may be a biological, chemical and/or medical sample comprising, for instance, cells and/or protein layers. The sample is fully or partially transparent. Thus, the sheared beams propagate through the sample and are then reflected by a reflective surface 5 of a reflective element 6. The reflective element 6 may be a mirror, particularly a metallic mirror or dielectric mirror. Other surfaces with high or partial reflectivity may also be used to form a reflective surface reflecting the two sheared beams in a direction opposite to the second direction of propagation or, in other words, in a direction opposite to the incident direction of the sheared beams.

The reflected sheared beams propagate a second time through the sample 4 and are then recombined into a single recombined beam by the Savart plate 3. The recombined beam is then polarized by the polarizing beam splitter 2 and detected by a detector 7, for instance a charge coupled device (CCD).

Effectively, the sheared beams form the two arms of a Mach-Zehnder interferometer, which can be used to very accurately detect the phase difference between any two points of the sample separated by the shear distance. In other words, the phase shifts experienced locally by the sheared beams in view of the sample lead to local phase differences between the reflected beams, which again cause an interference pattern that may be detected by the detector.

FIG. 2 illustrates a working principle underlying the apparatus of FIG. 1. FIG. 2 shows an illustrative structure 8 of an exemplary sample and two light rays 9, 10 of the two sheared beams. The two illustrated light rays 9, 10 are separated by the shear distance which may be, for instance, in the order of 10 to 50 μm. This distance is slightly lower than the width of the exemplary structure 8 in a direction perpendicular to the direction of propagation of the light rays 9, 10.

Figures 2A, 2B, 2C, 2D:
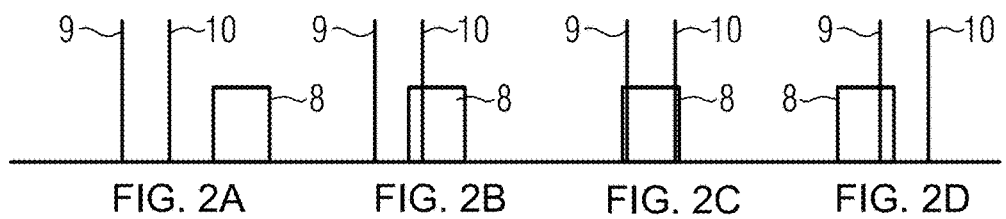
FIGS. 2A to 2D illustrate a working principle underlying the apparatus according to FIG. 1.

In FIG. 2A the situation is illustrated where the two rays 9, 10 do not pass through the structure 8. In this case, there is no phase shift between the two rays. Thus, when they are recombined by the Savart plate 3 of FIG. 1, no phase shift induced interference occurs.

In the case illustrated FIG. 2B the light ray 10 passes through the structure 8 and, thus, experiences a phase shift. Light ray 9 does not pass through the structure 8. This relative phase shift leads to a corresponding interference between the two rays 9, 10.

In the situation illustrated in FIG. 2C both rays 9, 10 propagate through the structure 8 and, thus, experience essentially the same phase shift.

In the situation illustrated in FIG. 2D ray 9 propagates through the structure 8 while light ray 10 does not. This situation is comparable to the situation illustrated in FIG. 2B but with the roles of rays 9 and 10 reversed. Thus, the light ray 9 experiences a phase shift while light ray 10 does not.

Figure 3A:
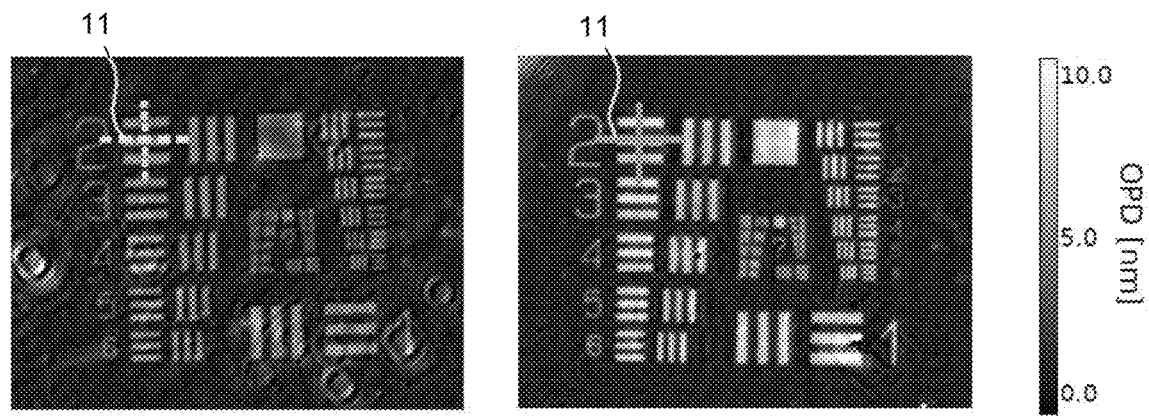
FIGS. 3A and 3B illustrate results obtainable by the apparatus of FIG. 1 in comparison with a prior art apparatus.
Figure 3B:
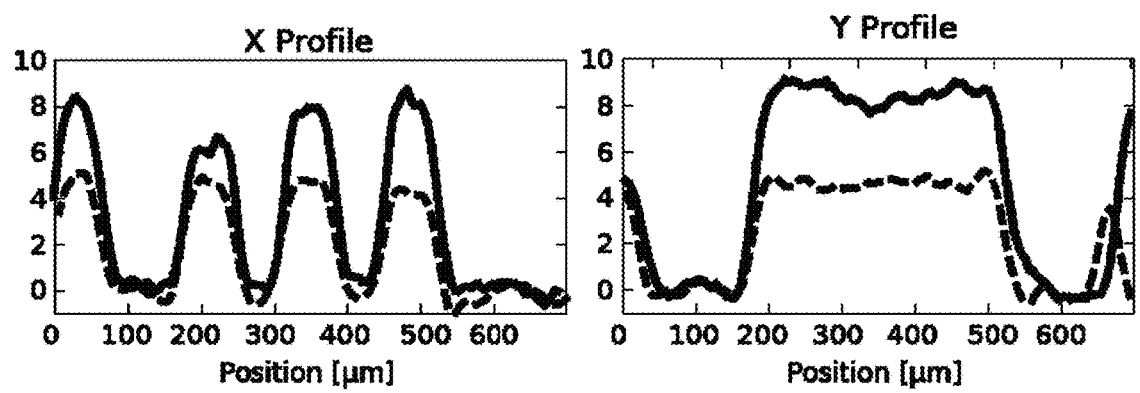

FIG. 3 illustrates the capabilities of the apparatus according to FIG. 1 by comparing the results with a prior art transmission scheme. For the test, an SiO$_2$ pattern on an SiO$_2$ substrate was used. The results illustrated on the left in FIG. 3a have been obtained with an apparatus as disclosed by U.S. Pat. No. 8,472,031. The results on the right in FIG. 3a have been obtained with an apparatus according to FIG. 1.

In FIG. 3A images of the observed sample structure are shown, wherein the grey scale represents the optical phase difference at the respective points with respect to locations separated by the shear distance. The phase difference along the vertical part of the cross-hair 11 (x-profile) is shown on the left of FIG. 3B while the phase difference along the horizontal part of the cross-hair 11 (y-profile) is shown on the right of FIG. 3B. The profile obtained by the prior art transmission scheme is shown as a dashed line while the profile obtained using the setup according to FIG. 1 is shown as a solid line. Indeed, the detected phase values using the apparatus of FIG. 1 are about twice as high compared to the results obtained by the prior art apparatus. This is due to the fact that the sheared beams propagate twice through the sample 4.

The Savart plate 3 illustrated in FIG. 1 is mounted in a plane perpendicular to the second direction of propagation. The Savart plate can be mounted such that it can be tilted with respect to this plane to introduce a variable phase shift between the two sheared beams. This variable phase shift can be used to perform a phase shift interferometric analysis of the sample, and to further enhance the sensitivity thereby.

Figure 4:
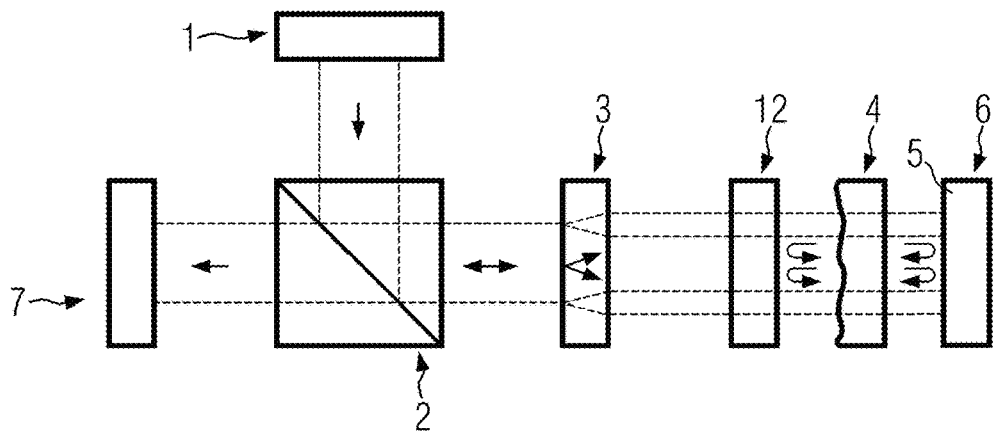
FIG. 4 illustrates another exemplary apparatus according to the first aspect of the invention.

FIG. 4 illustrates another example of an apparatus according to the first aspect of the invention. The setup basically corresponds to the setup of FIG. 1. However, an additional semi-transparent mirror 12 is arranged in the optical path of the sheared beams between the Savart plate 3 and the reflective element 6, particularly between the Savart plate 3 and the sample 4. In this way, a Fabry-Perot cavity is formed around the sample 4. Particularly, the sheared beams propagate multiple times through the sample 4, and the local phase shifts caused by the sample 4 are enhanced by a factor proportional to the finesse of the cavity.

Figure 5:
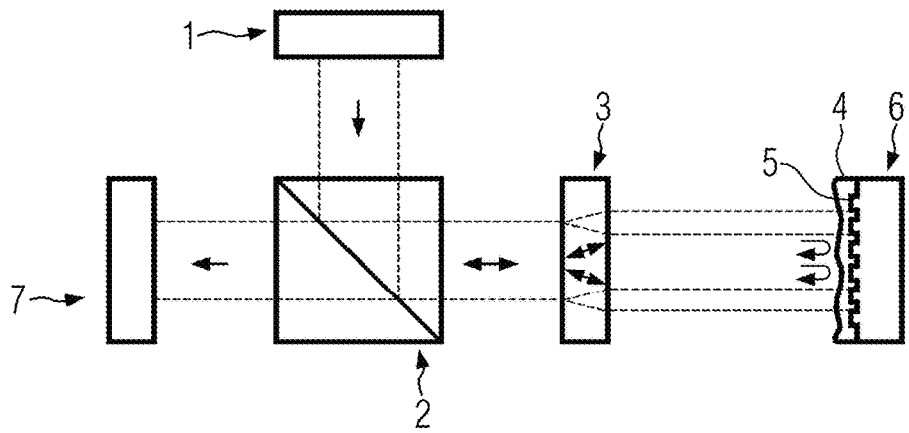
FIG. 5 illustrates another exemplary apparatus according to the first aspect of the invention.

A further exemplary apparatus according to the first aspect of the invention is illustrated in FIG. 5. In this case, the reflective surface 5 contains a patterned structure, for instance, a metallic structure, exhibiting a localized surface plasmon resonance, LSPR. The reflective surface, thus, is part of a plasmonic mirror 6. The sample 4 is in close proximity to the plasmonic mirror 6. In particular, the sample carrier on which the sample 4 is arranged may be mounted on the plasmonic mirror 6, i.e. in contact with the reflective surface. The sample 4 influences the resonance properties of the reflective surface exhibiting an LSPR resonance. In turn, these plasmonic properties enhance the phase shifts that the sample 4 would have created without the LSPR resonance. In this way, the sensitivity of the apparatus can be further increased.

In a further variant, which is not separately illustrated, the sample 4 may arranged in a cavity or channel of the plasmonic mirror behind or at the backside of the reflective surface 5. The expression "behind" shall be understood with reference to the direction of arrival of the sheared beams on the reflective surface. According to this variant, the sheared beams do not propagate through the sample 4 but the sample 4 influences the resonance properties of the plasmonic mirror and, thus, the local phase shifts of the reflected beams. This variant is advantageous particularly when the sample is to be arranged in a liquid since the sheared beams then do not need to pass through the liquid which may otherwise cause artifacts. The sample 4 may be arranged such that the distance between the sample 4 and the reflective surface 5, i.e. the surface where the sheared beams are reflected in use of the apparatus, may be less than ten, particularly less than 5 times the wavelength of the illuminating light. In other words, the cavity or channel of the plasmonic mirror behind or at the backside of the reflective surface 5 is essentially arranged immediately behind the reflective surface 5.

Figure 6:
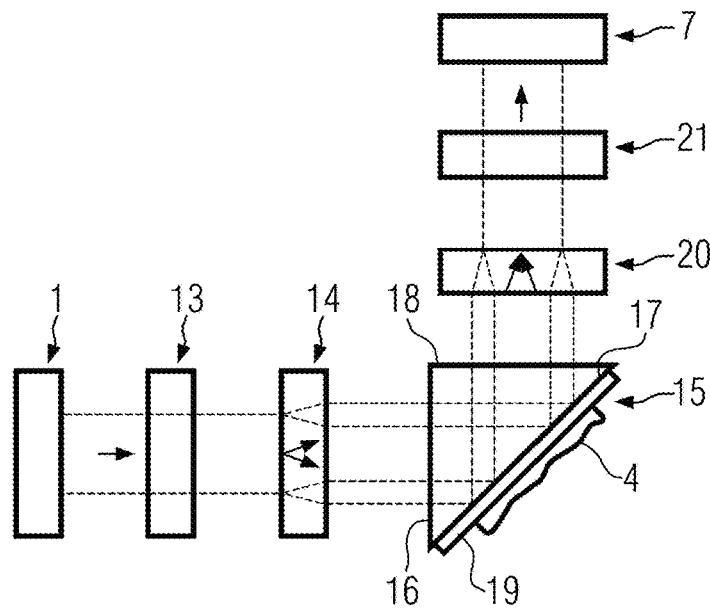
FIG. 6 illustrates an exemplary apparatus according to the second aspect of the invention.

FIG. 6 illustrates an exemplary apparatus according to a second aspect of the invention. The apparatus comprises a light source 1, such as a laser or an LED, as according to the first aspect of the invention described above. The illuminating light beam propagates in use of the apparatus through a first polarizing element 13 and a first birefringent element 14 in form of a first Savart plate. The sheared beams then enter a surface plasmon resonance prism 15 through an input face 16, are reflected by an inner reflective surface 17 and then exit the prism 15 through an output face 18. The sample 4 is arranged in close proximity to or in contact with an outer surface 19 of the prism, at the backside of the reflective surface 17. In view of the surface plasmon resonance, SPR, the evanescent field couples with the sample portion in contact or proximity with the surface of the prism thereby influencing the phase shifts. Thus, even though the sheared beams do not propagate entirely through the sample 4 but only interacts with a portion of it, through the evanescent field, again phase shifts can be imparted by the sample 4 and observed as an interference pattern.

By being reflected by the reflective surface 17, the sheared beams change from a first direction of propagation to a second direction of propagation at an angle with respect to the first direction of propagation. In other words, the angle between the first and the second direction of propagation is larger than 0°, and may particularly be larger than 30°. After exiting the surface plasmon resonance prism 15, the sheared beams are recombined by a second birefringent element in the form of the second Savart plate 20. The recombined beam is then polarized by a second polarizing element 21 and detected by a detector 7. The detector 7 can be a charge coupled device, CCD, and may be embodied in the same way as in the first aspect of the invention described above.

The surface plasmon resonance prism 15 may be tiltable or rotatable to vary the angle of reflection of the reflected sheared beams.

Figure 9:
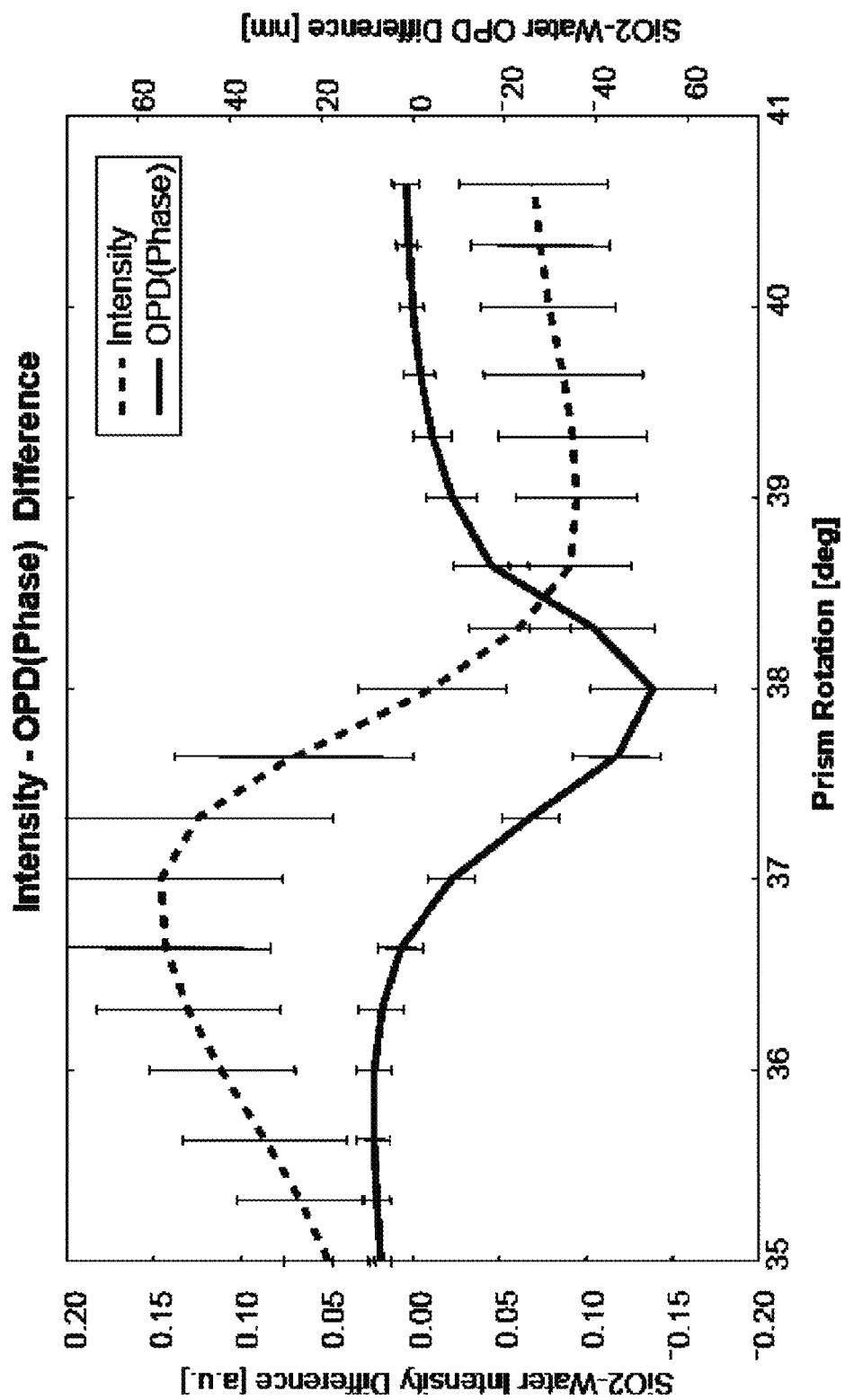
FIG. 9 illustrates a result obtainable with an apparatus according to FIG. 6.

The apparatus according to FIG. 6 offers the advantage that it can probe both the phase dependent and amplitude dependent properties of the surface plasmon resonance reflection of the sample 4. FIG. 9 represents the sensitivity of phase and intensity measurements of a set of nanometer thin SiO$_2$ patterns deposited on an SPR prism as illustrated in FIG. 6. Each value represents the difference of signal between a region with SiO$_2$ layer and a region without it. The associated error bars are calculated from the standard deviation of the signal in the probed regions. This procedure is repeated for different angles of incidence, each with a different plasmonic response and, thus, signal enhancement. In order to compare the physically different signals of phase and intensity, their curves have been rescaled so that their absolute modulation is equal. As can be seen from the error bars, the intensity measurements have a larger associated error than the phase measurements, (for this case it is from 3 to 4 times larger). This graph shows the advantages of phase over intensity measurements. Depending on the configuration, geometry and wavelength the detected signal can also be a combination of phase and intensity effects. Note that only intensity is detected and the apparatus converts phase effects into intensity modulation.

In some configurations, the first birefringent element 14 may be omitted. In this case, the second birefringent element 20, which may be a birefringent crystal plate instead of a Savart plate, splits the reflected illuminating light beam into two sheared beams. The second polarizing element may then be an analyzer and may be used to create interference between these two sheared beams, which is subsequently detected by the detector 7.

The polarizing elements shown in FIG. 6 select a linear polarization for the optical beam while the polarizing beam splitter used in the other embodiments separates spatially the beam into two beams according to their polarization. The polarizing beam splitter can be used as a polarizing element if only one of the two polarizations is selected.

Figure 7:
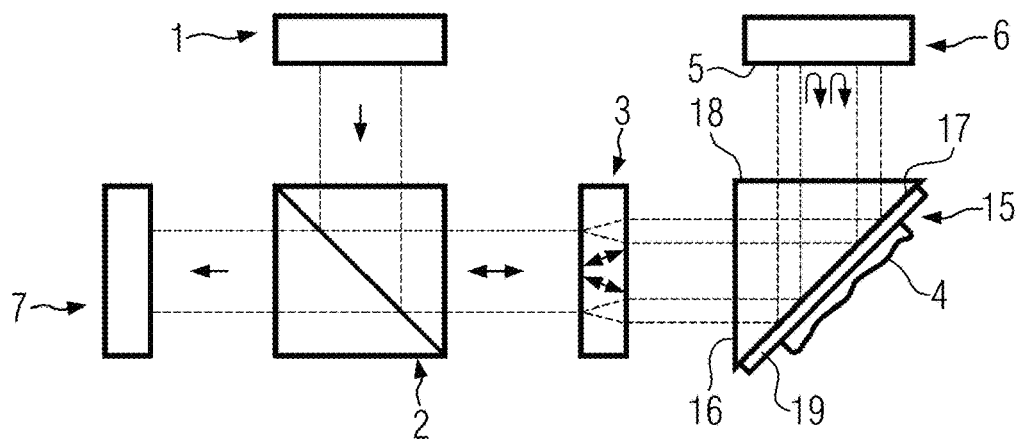
FIG. 7 illustrates another exemplary apparatus according to the first aspect of the invention.

FIG. 7 illustrates a further exemplary apparatus according to the first aspect of the invention. The apparatus according FIG. 7 basically corresponds to a combination of the apparatus shown in FIG. 1 and the apparatus shown in FIG. 6. Thus, a light source 1, a polarizing beam splitter 2, a Savart plate 3 and a detector 7 are foreseen. In contrast to the apparatus of FIG. 1, however, according to this embodiment, a surface plasmon resonance prism 15 is provided as described with reference to FIG. 6.

According to the embodiment shown in FIG. 1 and in contrast to the embodiment shown in FIG. 6, however, a reflective surface 5 as part of a reflective element 6 is provided for reflecting the sheared beams exiting the output face 18 of the SPR prism 15 back so that the reflected beams again enter the SPR prism 15 via the output face 18, are reflected by the reflective surface 17 and exit the prism 15 via the input face 16. The Savart plate 3 is then again used to recombine the reflected sheared beams and the recombined beam is detected by the detector 7 after being polarized by the polarizing beam splitter 2. The functionalities of the first and second polarizing elements 13, 21 in FIG. 6 is performed by the polarizing beam splitter 2 of FIG. 7.

Figure 8A:
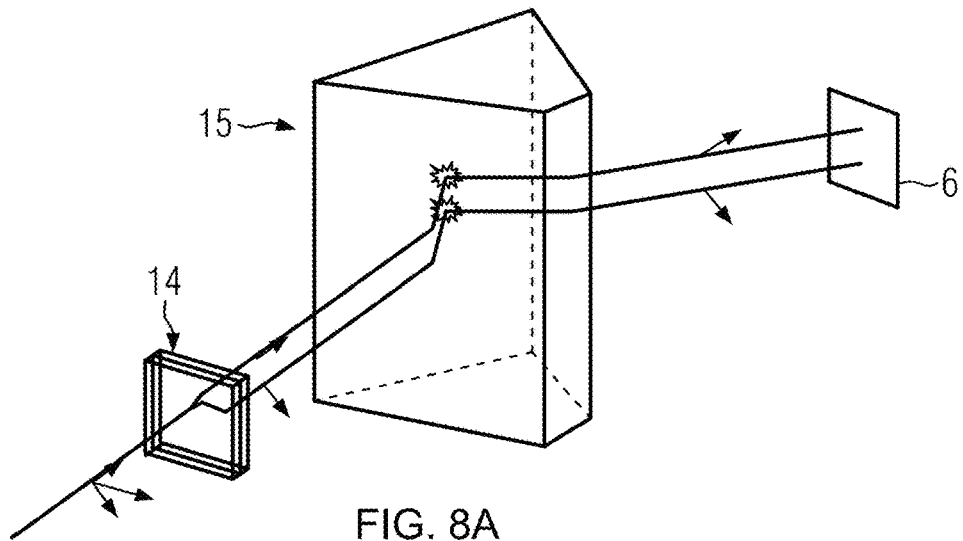
FIGS. 8a and 8b illustrate a working principle underlying the exemplary apparatuses shown in FIGS. 6 and 7.

In the apparatus illustrated in FIGS. 6 and 7, the surface plasmon resonance mode can be excited by either one or both of the sheared beams. In order to do so, the polarization has to be set accordingly. Particularly, a surface plasmon resonance mode cannot be excited by a polarization lying within the plane of the reflective surface. This is illustrated in FIG. 8. FIG. 8A shows a first polarization configuration, wherein the incoming illuminating light is horizontally (or vertically) polarized. The sheared beams are, thus, displaced vertically, and both can excite the surface plasmon resonance mode.

Figure 8B:
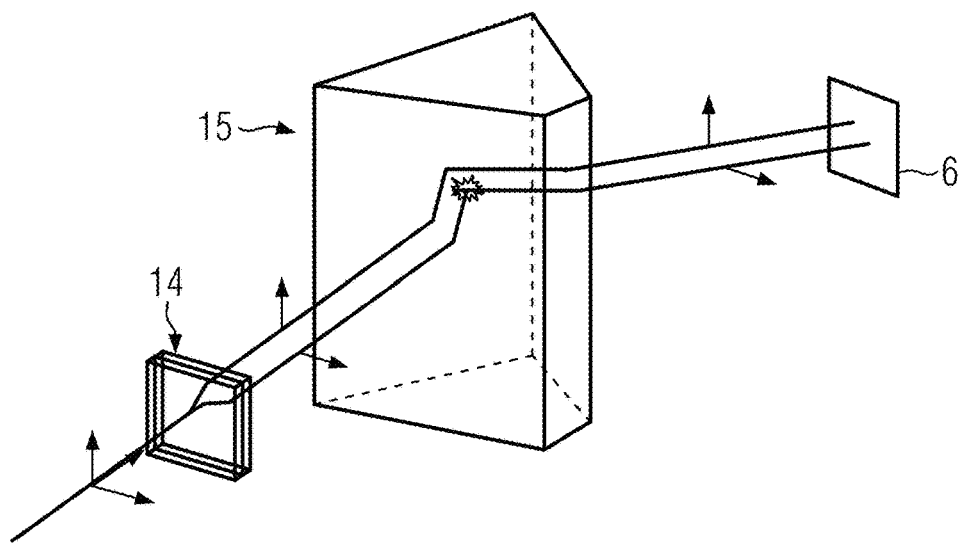

In FIG. 8B the incoming illuminating light is diagonally polarized, so that the sheared beams are displaced diagonally, and only one of them can excite the SPR mode, since the other has a polarization in the plane of the reflective surface of the SPR prism 15.

The discussed embodiments are not intended as limitations, but serve as examples illustrating features and advantages of the invention.

The invention claimed is:

1. An apparatus for probing a sample comprising:
   a light source for emitting an illuminating light beam;
   a birefringent element for splitting the illuminating light beam into two sheared beams;
   a reflective element for reflecting the two sheared beams, wherein the apparatus is configured such that reflected beams propagate through the birefringent element for recombining reflected beams; and
   a detector for detecting the recombined beam;
   wherein the apparatus is configured to receive the sample at a backside of a reflective surface in the optical path of the sheared beams, the reflective surface exhibiting a surface plasmon resonance or a localized surface plasmon resonance.

2. The apparatus according to claim 1, further comprising a polarizing element for polarizing the illuminating light beam prior to entering the birefringent element and for polarizing the recombined beam prior to being detected by the detector.

3. The apparatus according to claim 2, wherein the polarizing element is a polarizing beam splitter or wherein the birefringent element is a Savart plate.

4. The apparatus according to claim 1, further comprising a semi-reflective element in the optical path of the sheared beams, in particular between the birefringent element and the reflective element.

5. The apparatus according to claim 1, wherein the birefringent element is mounted such that it is tiltable with respect to a direction of propagation of the illuminating light beam.

6. The apparatus according to claim 1, wherein the reflective element is a mirror, particularly a metallic mirror, a dielectric mirror or a plasmonic mirror.

7. The apparatus according to claim 1, wherein the sample is arrangeable in close proximity to or in contact with the backside of the reflective surface exhibiting a surface plasmon resonance or a localized surface plasmon resonance.

8. The apparatus according to claim 1, further comprising a prism with a reflective surface for reflecting the sheared beams from a first direction of propagation to a second direction of propagation at an angle with respect to the first direction of propagation, wherein the reflective surface exhibits a surface plasmon resonance, and wherein the sample is arrangeable at the backside of the reflective surface.

9. The apparatus according to claim 8, wherein the reflective element reflects the sheared beams propagating along the second direction of propagation towards the reflective surface of the prism.

* * * * *